US009379307B2

(12) United States Patent
Ogura et al.

(10) Patent No.: US 9,379,307 B2
(45) Date of Patent: Jun. 28, 2016

(54) VIBRATOR ELEMENT, VIBRATOR, ELECTRONIC DEVICE, ELECTRONIC APPARATUS, AND MOVING OBJECT

(71) Applicant: Seiko Epson Corporation, Tokyo (JP)

(72) Inventors: Seiichiro Ogura, Minowa-machi (JP); Takayuki Kikuchi, Okaya (JP); Keiichi Yamaguchi, Ina (JP)

(73) Assignee: Seiko Epson Corporation (JP)

( * ) Notice: Subject to any disclaimer, the term of this patent is extended or adjusted under 35 U.S.C. 154(b) by 471 days.

(21) Appl. No.: 14/027,574

(22) Filed: Sep. 16, 2013

(65) Prior Publication Data

US 2014/0077664 A1    Mar. 20, 2014

(30) Foreign Application Priority Data

Sep. 20, 2012  (JP) ................................ 2012-206659

(51) Int. Cl.
| | |
|---|---|
| *H01L 41/08* | (2006.01) |
| *H03H 9/15* | (2006.01) |
| *G01C 19/5712* | (2012.01) |
| *G01C 19/5733* | (2012.01) |

(52) U.S. Cl.
CPC ............ *H01L 41/08* (2013.01); *G01C 19/5712* (2013.01); *G01C 19/5733* (2013.01)

(58) Field of Classification Search
CPC ............................ G01C 19/5607; H03L 1/022
USPC .................... 310/328, 338, 346, 348, 370; 331/107 A, 154, 158
See application file for complete search history.

(56) References Cited

U.S. PATENT DOCUMENTS

| | | | | |
|---|---|---|---|---|
| 2006/0107739 A1* | 5/2006 | Ogura | ................ | G01C 19/5607 73/504.12 |
| 2013/0221804 A1* | 8/2013 | Ichikawa | ........... | G01C 19/5621 310/323.21 |
| 2014/0020503 A1* | 1/2014 | Yamaguchi | ............... | G01P 9/04 74/5 R |
| 2014/0290362 A1* | 10/2014 | Nakagawa | ......... | G01C 19/5607 73/504.16 |
| 2015/0268107 A1* | 9/2015 | Nishizawa | .............. | G01L 1/162 310/321 |

FOREIGN PATENT DOCUMENTS

| | | |
|---|---|---|
| JP | 2005-156457 A | 6/2005 |
| JP | 2006-201011 A | 8/2006 |
| JP | 2008-026110 A | 2/2008 |
| JP | 2008-058061 A | 3/2008 |
| JP | 2008-151633 A | 7/2008 |
| JP | 2010-256332 A | 11/2010 |
| JP | 2015-90275 | * 5/2015 ......... G01C 19/5628 |

* cited by examiner

*Primary Examiner* — Thomas Dougherty
(74) *Attorney, Agent, or Firm* — Harness, Dickey & Pierce, P.L.C.

(57) ABSTRACT

A gyro element as a vibrator element fulfills the relationship: $|fd-fy1|>|fd-fy2|$, where fd is a drive vibrational frequency of first through fourth drive vibration arms, fy1 is a y1-mode vibrational frequency of a y1 mode, in which a base section and the first through fourth drive vibration arms vibrate in the same direction along a first direction (a y-axis direction) in which the first drive vibration arm extends, and fy2 is a y2-mode vibrational frequency of a y2 mode in which the base section vibrates along the first direction and the first through fourth drive vibration arms vibrate along the first direction in an opposite direction to a direction in which the base section vibrates.

19 Claims, 12 Drawing Sheets

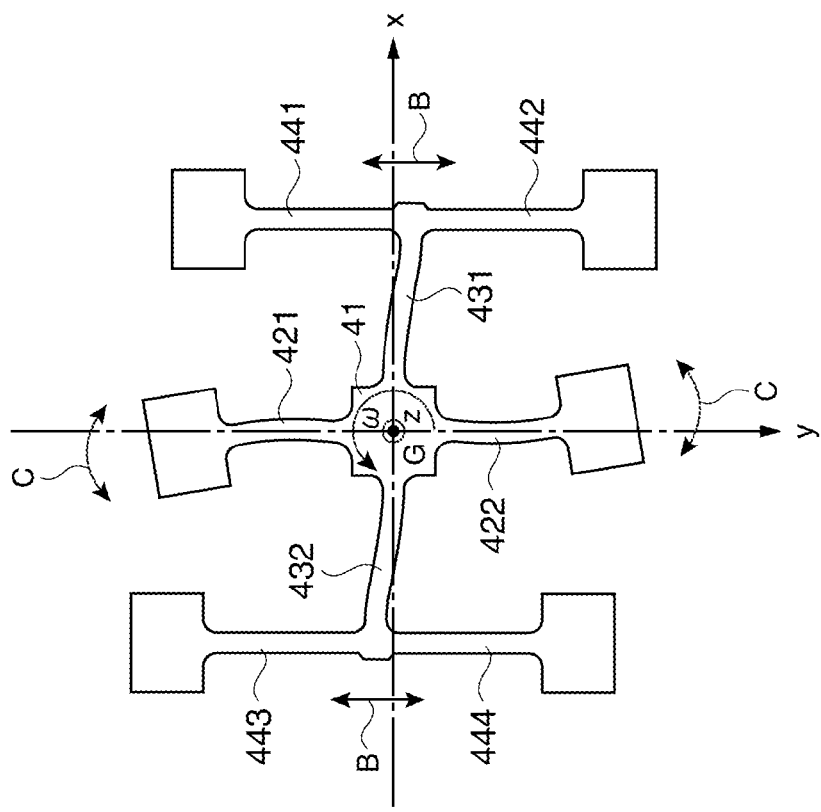
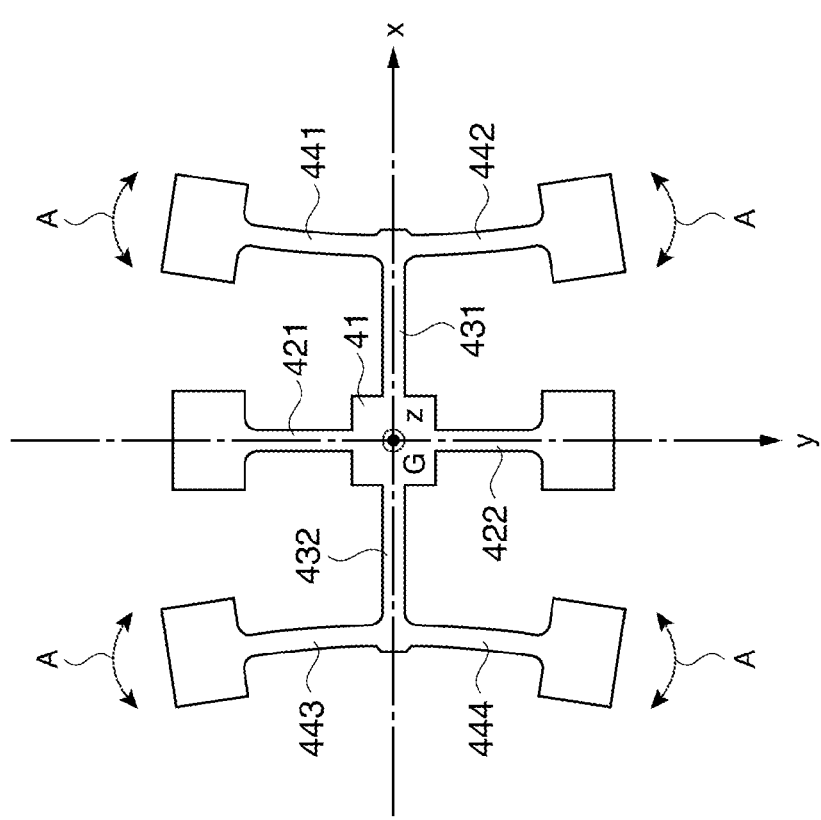

VIBRATOR ELEMENT, VIBRATOR, ELECTRONIC DEVICE, ELECTRONIC APPARATUS, AND MOVING OBJECT

BACKGROUND

1. Technical Field

The present invention relates to a vibrator element, a vibrator, an electronic device, an electronic apparatus, and a moving object each using the vibrator element.

2. Related Art

In the past, as a vibrator element for detecting an angular velocity, there has been known a so-called "double-T type" gyro vibrator element (see e.g., JP-A-2006-201011 (Document 1)). The gyro vibrator element described in Document 1 includes a base section, first and second detection vibration arms (detection arms) extending from the base section to the both sides along a y axis, first and second connection arms (connection arms) extending from the base section to the both sides along an x axis, first and second drive vibration arms (driving arms) extending from the first connection arm to the both sides along the y axis, third and fourth drive vibration arms (the driving arms) extending from the second connection arm to the both sides along the y axis, and weight sections disposed respectively on the tip portions of the first and second detection vibration arms and the first through fourth drive vibration arms so as to have a larger width.

In recent years, such a gyro vibrator element as described above has been expanding in application such as portable equipment or on-vehicle equipment. Thus, the range of the temperature environment, in which the gyro vibrator element is used, has been widened, and it has been becoming required to stably operate in a broad temperature range. Further, in addition, miniaturization has also been becoming required.

In such a gyro vibrator element as described above, even in the case of regulating the resonant frequencies fd (Hz) (hereinafter referred to as "driving vibrational frequency fd") of the first through fourth drive vibration arms to a predetermined value in the room temperature, when the ambient temperature changes to high temperature or low temperature, there occurs a so-called temperature drift such as a resonant frequency fluctuation or a characteristic fluctuation. It has been known that the occurrence of the temperature drift is affected by an unwanted vibration such as a vibration in an out-of-plane flexural vibration mode. In order to suppress the temperature drift, there has been proposed in, for example, JP-A-2008-26110 (Document 2) to set the out-of-plane flexural first-order mode vibrational frequency fs1 as the out-of-plane flexural vibration mode to either one of $fd \times 2.2 \le fs1 \le fd \times 2.8$ and $fd \times 3.2 \le fs1 \le fd \times 3.8$.

However, the gyro vibrator element of the related art described above is effective in the relationship between the driving vibrational frequency fd and the out-of-plane flexural mode vibrational frequency fs, but does not have sufficient effect with respect to an unwanted vibration different from the out-of-plane flexural mode, and therefore, further reduction of the temperature drift has been demanded.

SUMMARY

An advantage of some aspects of the invention is to solve at least a part of the problems described above, and the invention can be implemented as the following aspects and application examples.

APPLICATION EXAMPLE 1

This application example is directed to a vibrator element including a base section, a first vibration arm extending from the base section, and a second vibration arm extending from the base section along a direction opposite to a direction in which the first vibration arm extends, wherein the vibrator element fulfills the relationship: $|fd-fy1|>|fd-fy2|$, where fd is a drive vibrational frequency at which the first vibration arm and the second vibration arm vibrate along a second direction perpendicular to a first direction in which one of the first vibration arm and the second vibration arm extends, fy1 is a y1-mode vibrational frequency at which the base section, the first vibration arm, and the second vibration arm vibrate in the same direction along the first direction, and fy2 is a y2-mode vibrational frequency at which the base section vibrates along the first direction, and the first vibration arm and the second vibration arm vibrate along the first direction in an opposite direction to a direction in which the base section vibrates.

APPLICATION EXAMPLE 2

This application example is directed to the vibrator element according to the application example described above, wherein the y1-mode vibrational frequency fy1 is a frequency, at which a centroid of the base section, and the first vibration arm and the second vibration arm vibrate in the same direction along the first direction, and the y2-mode vibrational frequency fy2 is a frequency, at which a centroid of the base section vibrates along the first direction, and the first vibration arm and the second vibration arm vibrate along the first direction in an opposite direction to a direction in which the centroid of the base section vibrates.

The vibrations in the y1 mode and the y2 mode in the vibrator element described above are the unwanted vibrations excited, although slightly, while the vibrator element is driven (operating). The y2 mode is a vibration mode in which the base section or the centroid of the base section moves (vibrates) along the first direction, and the first vibration arm and the second vibration arm move (vibrate) along the first direction in the opposite direction to the direction in which the base section or the centroid of the base section moves (vibrates). In such a y2 mode, since the base section or the centroid of the base section moves along the first direction in the opposite direction to the direction in which the first vibration arm and the second vibration arm move along the first direction, it results that the vibrations due to the respective movements are confined. In contrast, the vibration in the y1 mode is a vibration mode in which the base section or the centroid of the base section and the first vibration arm and the second vibration arm move (vibrate) along the first direction in the same direction. Therefore, the vibration of the base section and the vibration of the first vibration arm and the second vibration arm fail to be completely confined, and affect the temperature drift of the vibrator element as the unwanted mode vibration. It should be noted that the vibrations in the y2 mode and the vibration in the y1 mode are apt to be excited in the case in which the y2-mode vibrational frequency fy2 or the y1-mode vibrational frequency fy1 approaches the drive vibrational frequency fd of the first vibration arm and the second vibration arm.

According to the application example described above, the relationship between the drive vibrational frequency fd of the first vibration arm and the second vibration arm, the y1-mode vibrational frequency fy1 of the y1 mode, and the y2-mode vibrational frequency fy2 of the y2 mode is set to $|fd-fy1|>|fd-fy2|$. In other words, the difference between the y1-mode vibrational frequency fy1 easily affecting the temperature drift of the vibrator element as the unwanted mode vibration and the drive vibrational frequency fd of the first vibration arm and the second vibration arm is set to be larger than the difference between the y2-mode vibrational frequency fy2 and the drive vibrational frequency fd of the first vibration arm and the second vibration arm. Thus, since the vibration in the y1 mode, which affects the temperature drift of the vibrator element as the unwanted mode vibration becomes difficult to excite, the influence on the temperature drift of the vibrator element can be suppressed, and thus, it becomes possible to provide the vibrator element having the stable characteristic with little temperature drift.

APPLICATION EXAMPLE 3

This application example is directed to the vibrator element according to the application example described above, wherein the vibrator element further includes a first beam and a second beam extending from the base section in respective directions opposite to each other in a plan view, a first fixation section connected to the first beam, and a second fixation section disposed on an opposite side to the first beam across the base section in the plan view, and connected to the second beam.

According to this application example, the first fixation section and the second fixation section are disposed via the first beam and the second beam extending from the base section in the respective directions opposite to each other. Since the base section is connected to each of the first fixation section and the second fixation section disposed so as to be opposed to each other as described above, it becomes possible to relax the stress generated from the base section to the beams, and thus, it becomes possible to reduce the propagation of the vibration to the fixation sections due to the vibration leakage phenomenon propagating to the beams.

APPLICATION EXAMPLE 4

This application example is directed to the vibrator element according to the application example described above, wherein a thickness of each of the first beam and the second beam is smaller than a thickness of the base section.

According to this application example, by making the thickness of the first beam and the second beam smaller than the thickness of the base section, the y1-mode vibrational frequency fy1 of the y1 mode can be made further from the drive vibrational frequency fd of the first vibration arm and the second vibration arm. Therefore, it becomes possible to provide the vibrator element with little temperature drift.

APPLICATION EXAMPLE 5

This application example is directed to the vibrator element according to the application example described above, wherein the first beam and the second beam extend along the first direction, the first beam is provided with a projection section disposed toward the first vibration arm, and the second bean is provided with a projection section disposed toward the second vibration arm.

According to this application example, even in the case in which the first beam and the second beam, which have been reduced in thickness to thereby be reduced in rigidity and easy to deform, are deformed due to an impact applied from the outside, the projection sections thus provided have contact with the first vibration arm or the second vibration arm. In other words, the projection sections provided to the first beam and the second beam function as so-called buffers for absorbing the impact, and it becomes possible to prevent the breakage of the vibrator element.

APPLICATION EXAMPLE 6

This application example is directed to the vibrator element according to the application example described above, wherein the vibrator element further includes a first detection vibration arm and a second detection vibration arm extending from the base section toward both sides along the first direction.

According to this application example, since the first detection vibration arm and the second detection vibration arm are provided, it becomes possible to detect the angular velocity with the temperature drift reduced.

APPLICATION EXAMPLE 7

This application example is directed to the vibrator element according to the application example described above, wherein the first vibration arm includes a first drive vibration arm and a second drive vibration arm, the second vibration arm includes a third drive vibration arm and a fourth drive vibration arm, the first beam includes a first connection beam extending from the base section and passing between the first detection vibration arm and the first drive vibration arm, and a second connection beam extending from the base section and passing between the first detection vibration arm and the second drive vibration arm, the second beam includes a third connection beam extending from the base section and passing between the second detection vibration arm and the third drive vibration arm, and a fourth connection beam extending from the base section and passing between the second detection vibration arm and the fourth drive vibration arm, and the base section is connected to the first fixation section and the second fixation section via the first connection beam, the second connection beam, the third connection beam, and the fourth connection beam.

According to this application example, the base section is connected to each of the first fixation section and the second fixation section disposed so as to be opposed to each other using each of the first through fourth connection beams. Thus, it becomes possible to relax the stress generated from the base section to the beams, and thus, it becomes possible to reduce the propagation of the vibration to the fixation sections due to the vibration leakage phenomenon propagating to the beams. Therefore, it becomes possible to reduce the temperature drift due to the vibration leakage phenomenon, and the detection of the angular velocity with the temperature drift further reduced becomes possible in combination with the reduction of the temperature drift due to the unwanted vibration described above.

APPLICATION EXAMPLE 8

This application example is directed to a vibrator including the vibrator element according to any one of the application examples described above, and a package adapted to house the vibrator element.

According to this application example, since the vibrator element described above is used, the vibrator with the stable characteristic, in particular, the vibrator high in reliability with the temperature drift reduced, can be provided.

APPLICATION EXAMPLE 9

This application example is directed to an electronic device including the vibrator element according to any one of the application examples described above, and a circuit component having a function of driving the vibrator element.

According to this application example, since the vibrator element described above is used, the electronic device with the stable characteristic, in particular, the electronic device high in reliability with the temperature drift reduced, can be provided.

APPLICATION EXAMPLE 10

This application example is directed to an electronic apparatus including the vibrator element according to any one of the application examples described above.

According to this application example, since the vibrator element described above is used, the electronic apparatus with the stable characteristic, in particular, the electronic apparatus high in reliability due to the reduction of the temperature drift and so on, can be provided.

APPLICATION EXAMPLE 11

This application example is directed to a moving object including the vibrator element according to any one of the application examples described above.

According to this application example, since the vibrator element described above is used, it becomes possible to provide the moving object high in the reliability with respect to the temperature change.

BRIEF DESCRIPTION OF THE DRAWINGS

The invention will be described with reference to the accompanying drawings, wherein like numbers reference like elements.

FIGS. 1A and 1B are schematic diagrams showing a vibrator element as a first embodiment of the invention, and a vibrator using the vibrator element as the embodiment, wherein FIG. 1A is a plan view, and FIG. 1B is a front cross-sectional view.

FIGS. 3A and 3B are plan views for explaining drive of the gyro element.

FIGS. 4A and 4B are diagrams for explaining an unwanted mode vibration, wherein FIG. 4A is a schematic perspective view showing a vibration in a y1 mode, and FIG. 4B is a schematic perspective view showing a vibration in a y2 mode.

FIGS. 7A and 7B are diagrams showing a gyro element according to a second embodiment of the invention, wherein FIG. 7A is a plan view, and FIG. 7B is a cross-sectional view along the Q-Q line in FIG. 7A.

DESCRIPTION OF EXEMPLARY EMBODIMENTS

Hereinafter, a vibrator element and a vibrator according to the invention will be explained in detail based on the embodiments shown in the accompanying drawings.

Embodiments

Firstly, the vibrator element according to the embodiment of the invention, and the vibrator equipped with the vibrator element according to the embodiment of the invention will be explained.

Figure 1A:
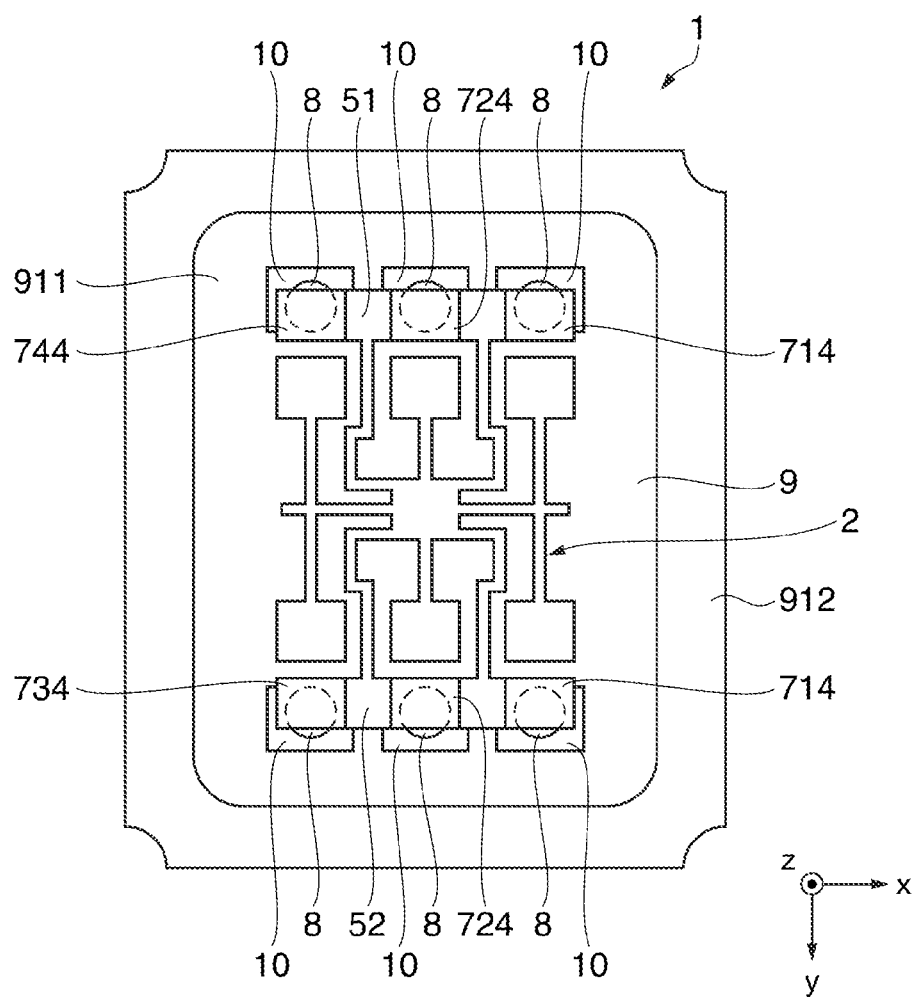
Figure 1B:
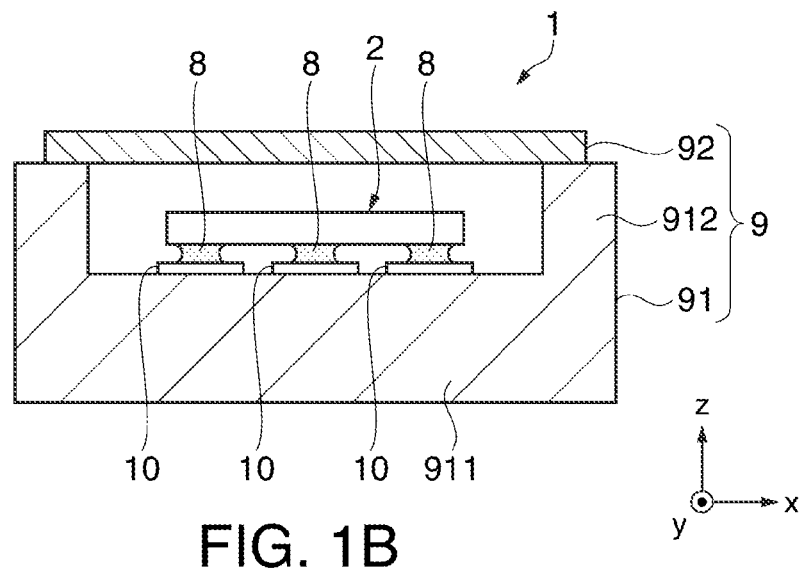
Figure 2:
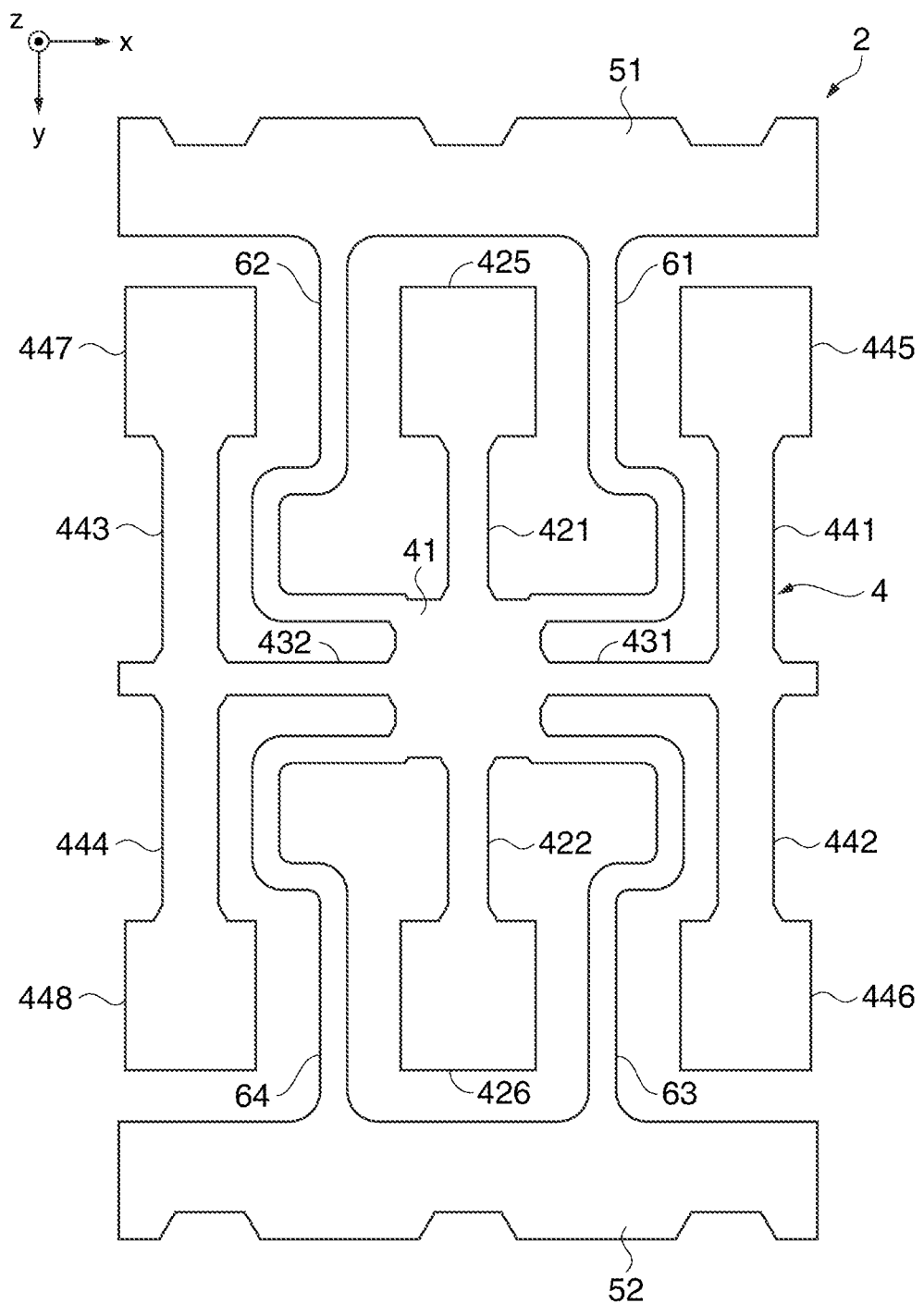
FIG. 2 is a plan view showing a gyro element according to the first embodiment.

FIGS. 1A and 1B are diagrams showing the vibrator element as a first embodiment of the invention, and a vibrator using the vibrator element as the embodiment, wherein FIG. 1A is a plan view, and FIG. 1B is a front cross-sectional view. FIG. 2 is a plan view showing a gyro element as the vibrator element provided to the vibrator shown in FIGS. 1A and 1B. FIGS. 3A and 3B are plan views for explaining drive of the gyro element. It should be noted that in the following explanation, three axes perpendicular to each other are defined as an x axis, a y axis, and a z axis, and the z axis coincides with the thickness direction of the vibratory device. Further, the direction parallel to the x axis is referred to as an "x-axis direction (a second direction)," the direction parallel to the y axis is referred to as a "y-axis direction (a first direction)," and the direction parallel to the z axis is referred to as a "z-axis direction."

The vibrator 1 shown in FIGS. 1A and 1B has a gyro element (vibrator element) 2 and a package 9 for housing the gyro element 2. Hereinafter, the gyro element 2 and the package 9 will sequentially be explained in detail.

Gyro Element According To First Embodiment

FIG. 2 is a plan view showing the gyro element according to the first embodiment as the vibrator element viewed from above (a lid 92 side). It should be noted that a detection signal electrode, detection signal wiring, a detection signal terminal, a detection ground electrode, detection ground wiring, a detection ground terminal, a drive signal electrode, drive signal wiring, a drive signal terminal, a drive ground electrode, drive ground wiring, a drive ground terminal, and so on are provided to the gyro element, but are omitted from the drawing.

The gyro element 2 as the vibrator element is an "out-of-plane detection type" sensor for detecting an angular velocity around the z axis, and is composed of a base member, and a plurality of electrodes, wiring lines, and terminals disposed on the surface of the base member although not shown in the drawing.

The gyro element 2 can be formed of a piezoelectric material such as quartz crystal, lithium tantalate, or lithium niobate, and is preferably formed of quartz crystal among these materials. According to the configuration described above, the gyro element 2 capable of exerting excellent vibration characteristics (frequency characteristics) can be obtained.

Such a gyro element 2 as described above has a vibrating body 4 forming a so-called double-T type, a first fixation section 51 and a second fixation section 52 as a support section for supporting the vibrating body 4, a first connection beam 61 and a second connection beam 62 as a first beam for connecting the vibrating body 4 and the first fixation section 51 to each other, and a third connection beam 63 and a fourth connection beam 64 as a second beam for connecting the vibrating body 4 and the second fixation section 52 to each other.

The vibrating body 4 spreads in an x-y plane, and has a thickness in the z-axis direction. Such a vibrating body 4 as described above has a base section 41 located at the center, a first detection vibration arm 421 and a second detection vibration arm 422 extending from the base section 41 on both sides along the y-axis direction, a first connection arm 431 and a second connection arm 432 extending from the base section 41 on both sides along the x-axis direction, a first drive vibration arm 441 as a first vibration arm and a third drive vibration arm 442 as a second vibration arm extending from a tip portion of the first connection arm 431 on both sides along the y-axis direction, and a second drive vibration arm 443 as the first vibration arm and a fourth drive vibration arm 444 as the second vibration arm extending from a tip portion of the second connection arm 432 on both sides along the y-axis direction. The first drive vibration arm 441 as the first vibration arm extends from the base section 41 via the first connection arm 431. The third drive vibration arm 442 as the second vibration arm extends from the base section 41 via the first connection arm 431 along the opposite direction to the direction in which the first drive vibration arm 441 extends. The second drive vibration arm 443 as the first vibration arm extends from the base section 41 via the second connection arm 432. The fourth drive vibration arm 444 as the second vibration arm extends from the base section 41 via the second connection arm 432 along the opposite direction to the direction in which the second drive vibration arm 443 extends. At the tip portions of the first and second detection vibration arms 421, 422, and the first through fourth drive vibration arms 441, 443, 442, and 444, there are respectively disposed weight sections (hammerheads) 425, 426, 445, 447, 446, and 448 as wider portions each having a quadrangular shape with a larger width than the base end side. By providing such weight sections 425, 426, 445, 447, 446, and 448, the detection sensitivity of the angular velocity of the gyro element 2 is improved, and at the same time, the length of each of the first and second detection vibration arms 421, 422, and the first through fourth drive vibration arms 441, 443, 442, and 444 can be shortened.

It should be noted that the first and third drive vibration arms 441, 442 can extend from the middle in the extending direction of the first connection arm 431, and similarly, the second and fourth drive vibration arms 443, 444 can extend in the middle in the extending direction of the second connection arm 432.

Further, although the explanation is presented with the configuration in which the first and third drive vibration arms 441, 442 and the second and fourth drive vibration arms 443, 444 extend respectively from the first connection arm 431 and the second connection arm 432 extending from the base section 41 in this embodiment, it is also possible to define that the base section includes the base section 41, the first connection arm 431, and the second connection arm 432. In other words, it is also possible to adopt the configuration in which the first through fourth drive vibration arms extend from the base section.

Further, the first and second fixation sections 51, 52 each extend along the x-axis direction, and the vibrating body 4 is located between the first and second fixation sections 51, 52. In other words, the first and second fixation sections 51, 52 are arranged so as to be opposed to each other along the y-axis direction across the vibrating body 4. The first fixation section 51 is connected to the base section 41 via the first and second connection beams 61, 62, and the second fixation section 52 is connected to the base section 41 via the third and fourth connection beams 63, 64.

The first connection beam 61 passes between the first detection vibration arm 421 and the first drive vibration arm 441, and connects the first fixation section 51 and the base section 41, the second connection beam 62 passes between the first detection vibration arm 421 and the second drive vibration arm 443, and connects the first fixation section 51 and the base section 41, the third connection beam 63 passes between the second detection vibration arm 422 and the third drive vibration arm 442, and connects the second fixation section 52 and the base section 41, and the fourth connection beam 64 passes between the second detection vibration arm 422 and the fourth drive vibration arm 444, and connects the second fixation section 52 and the base section 41.

Such connection beams 61, 62, 63, and 64 each have a meandering portion (an S-shaped portion) extending along the y-axis direction while reciprocating along the x-axis direction to thereby be elasticized in both of the x-axis direction and the y-axis direction. Further, the connection beams 61, 62, 63, and 64 each have an elongated shape with the meandering portion, and are therefore elastic in all directions. Therefore, even in the case in which an impact is externally applied, the connection beams 61, 62, 63, and 64 have a function of absorbing the impact, and therefore, the detection noise due to the impact can be reduced or inhibited.

The gyro element 2 having the configuration described above detects the angular velocity $\omega$ around the z axis in such a manner as described below. In the gyro element 2, when an electric field is generated between the drive signal electrode (not shown) and the drive ground electrode (not shown) in the state in which no angular velocity $\omega$ is applied, flexural vibrations indicated by the arrows A occur in the respective drive vibration arms 441, 443, 442, and 444 as shown in FIG. 3A. On this occasion, since the first and second drive vibration arms 441, 443, and the third and fourth drive vibration arms 442, 444 perform the vibrations plane-symmetrical with each other about the y-z plane passing through the center point G (the centroid G), the base section 41, the first and second connection arms 431, 432, and the first and second detection vibration arms 421, 422 hardly vibrate.

When the angular velocity $\omega$ around the z axis is applied to the gyro element 2 in the state of performing the driving vibration described above, the vibration shown in FIG. 3B is generated. Specifically, a Coriolis force in the direction of the arrow B acts on the drive vibration arms 441, 443, 442, and 444, and the connection arms 431, 432, and in accordance with the vibration in the direction of the arrow B, the detection vibration in the direction of the arrow C is excited. Further, the distortion of the detection vibration arms 421, 422 generated by the vibration is detected via the detection signal electrode (not shown) and the detection ground electrode (not shown), and thus the angular velocity $\omega$ can be obtained.

Unwanted Vibration Mode of Gyro Element

Here, the unwanted vibration in the gyro element 2 will be explained. In the gyro element 2, there occurs the unwanted vibration excited while the gyro element 2 is driven (operating) although the unwanted vibration is minute. Although there are various types of vibration modes in the unwanted vibration, the inventors focus attention on the fact that the temperature drift in the characteristics of the gyro element 2 is significantly affected by the two vibration modes (i.e., the vibration in the y1 mode, and the vibration in the y2 mode) described below.

Figure 4A:
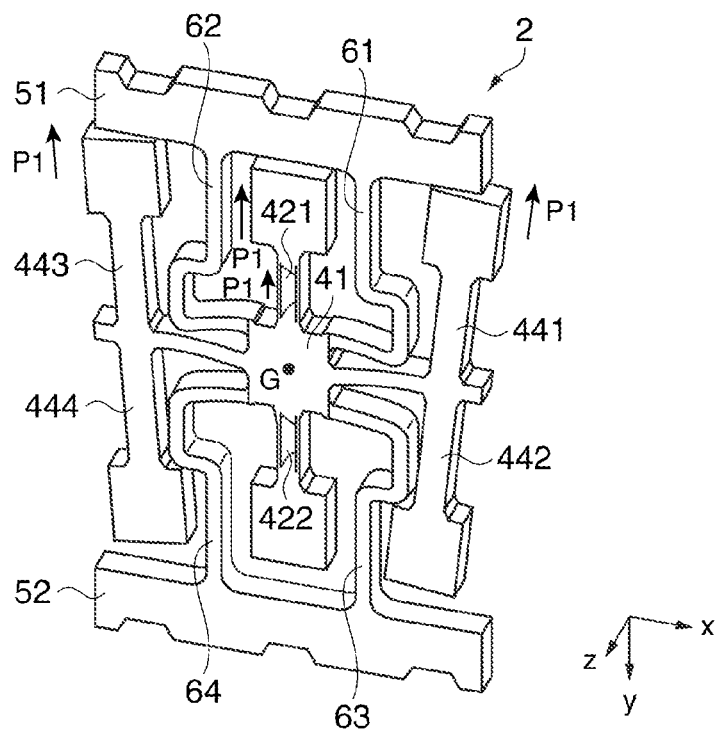
Figure 4B:
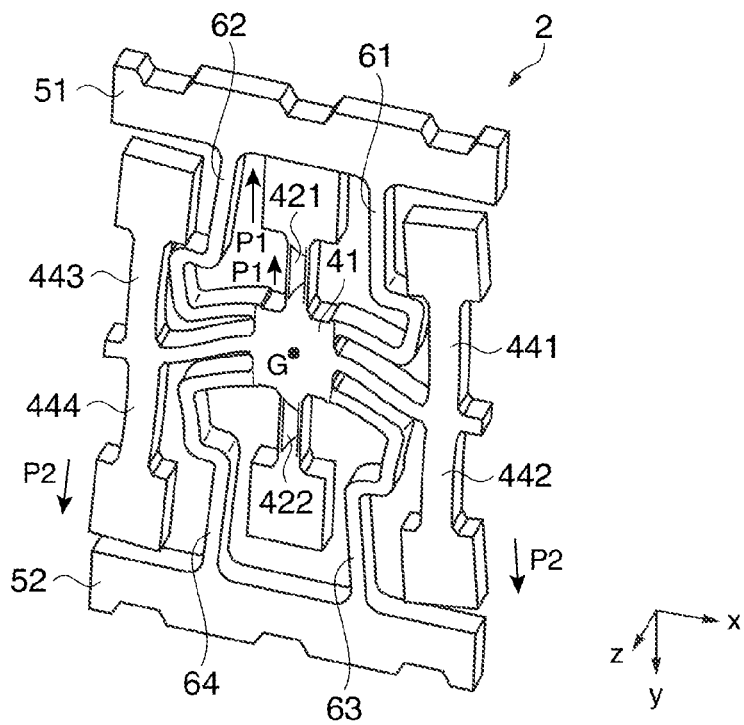
Figure 5A:
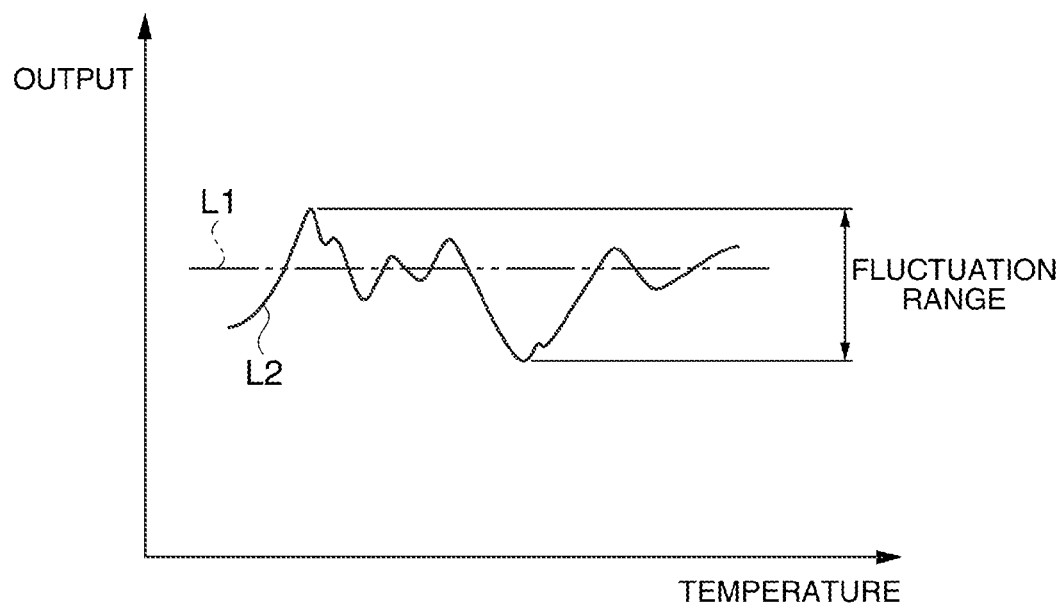
FIGS. 5A through 5C are explanatory diagrams for explaining the characteristics of the gyro element.
Figure 5B:
Figure 5C:
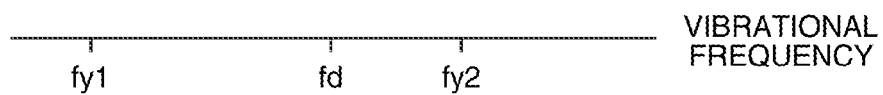

Here, the vibrations in the y1 mode and the y2 mode, and the influences of the vibrations on the characteristics of the gyro element 2 will be explained using FIGS. 4A, 4B, and 5A through 5C. The vibrations in the y1 mode and the y2 mode are the unwanted vibrations excited, although slightly, while the gyro element 2 is driven (operating). FIGS. 4A and 4B are diagrams for explaining the vibrations in the y1 mode and the y2 mode as the unwanted vibration modes, wherein FIG. 4A is a schematic perspective view showing the vibration in the y1 mode, and FIG. 4B is a schematic perspective view showing the vibration in the y2 mode. FIGS. 5A through 5C are explanatory diagrams of the influences of the vibrations in the y1 mode and the y2 mode as the unwanted vibration modes on the characteristics of the gyro element 2.

Firstly, the vibration in the y1 mode will be explained. As shown in FIG. 4A, the centroid G of the base section 41 moves in the direction (the −y-axis direction) of the arrow P1 shown in the drawing together with the first and second detection vibration arms 421, 422 extending from the base section 41 along the y-axis direction. On this occasion, the first drive vibration arm 441 as the first vibration arm, the third drive vibration arm 442 as the second vibration arm, the second drive vibration arm 443 as the first vibration arm, and the fourth drive vibration arm 444 as the second vibration arm each extending from the base section 41 via the first and second connection arms 431, 432 move in the direction (the −y-axis direction) of the arrow P1 shown in the drawing. In other words, the y1 mode is the vibration mode in which the base section 41, the first drive vibration arm 441 as the first vibration arm, the third drive vibration arm 442 as the second vibration arm, the second drive vibration arm 443 as the first vibration arm, and the fourth drive vibration arm 444 as the second vibration arm move (vibrate) in the same direction. In more detail, the y1 mode is the vibration mode in which the centroid G of the base section 41, the first drive vibration arm 441 as the first vibration arm, the third drive vibration arm 442 as the second vibration arm, the second drive vibration arm 443 as the first vibration arm, and the fourth drive vibration arm 444 as the second vibration arm move (vibrate) in the same direction.

In such a vibration in the y1 mode, since the centroid G of the base section 41 and the first through fourth drive vibration arms 441, 443, 442, and 444 move in the same direction, it is not achievable to completely confine the vibration of the base section 41 and the vibration of the first through fourth drive vibration arms 441, 443, 442, and 444, and thus the vibration characteristics of the gyro element 2, in particular the temperature drift, which is a characteristic fluctuation depending on the temperature, are affected by the vibrations. Specifically, as represented by the curve L2 shown in FIG. 5A, the so-called temperature drift increases, which is the phenomenon that the fluctuation range of the output due to the fluctuation of the output characteristic of the gyro element 2 increases with the variation of the temperature. It should be noted that if no temperature drift occurs, the characteristic with little fluctuation as represented by the curve L1 can be obtained.

Then, the vibration in the y2 mode will be explained. As shown in FIG. 4B, the centroid G of the base section 41 moves in the direction (the −y-axis direction) of the arrow P1 shown in the drawing together with the first and second detection vibration arms 421, 422 extending from the base section 41 along the y-axis direction. On this occasion, the first drive vibration arm 441 as the first vibration arm, the third drive vibration arm 442 as the second vibration arm, the second drive vibration arm 443 as the first vibration arm, and the fourth drive vibration arm 444 as the second vibration arm each extending from the base section 41 via the first and second connection arms 431, 432 move in the direction (the +y-axis direction) of the arrow P2 shown in the drawing. In other words, the y2 mode is the vibration mode in which the first drive vibration arm 441 as the first vibration arm, the third drive vibration arm 442 as the second vibration arm, the second drive vibration arm 443 as the first vibration arm, and the fourth drive vibration arm 444 as the second vibration arm move (vibrate) in a direction opposite to the direction in which the base section 41 moves (vibrates). In more detail, the y2 mode is the vibration mode in which the first drive vibration arm 441 as the first vibration arm, the third drive vibration arm 442 as the second vibration arm, the second drive vibration arm 443 as the first vibration arm, and the fourth drive vibration arm 444 as the second vibration arm move (vibrate) in a direction opposite to the direction in which the centroid G of the base section 41 moves (vibrates).

In such a vibration in the y2 mode, since the centroid G of the base section 41 moves in the direction opposite to the direction in which the first through fourth drive vibration arms 441, 443, 442, and 444 move, the vibrations due to the movement of the respective components cancel out each other, and as a result, the vibrations are confined. Therefore, the vibration in the y2 mode hardly affects the vibration characteristics of the gyro element 2, in particular the temperature drift, which is a characteristic fluctuation depending on the temperature.

Then, the excitation of the y1 mode and the y2 mode will be explained. Here, the explanation will be presented assuming that the vibrational frequency in the y1 mode is a y1-mode vibrational frequency fy1, the vibrational frequency in the y2 mode is a y2-mode vibrational frequency fy2, and the resonant frequency of the first through fourth drive vibration arms 441, 443, 442, and 444 is a drive vibrational frequency fd of the vibration arms.

As shown in FIG. 5B, in the case in which the difference |fd−fy2| between the y2-mode vibrational frequency fy2 and the drive vibrational frequency fd of the vibration arms is larger than the difference |fd−fy1| between the y1-mode vibrational frequency fy1 and the drive vibrational frequency fd of the vibration arms, the vibration in the y1 mode becomes easier to excite out of the vibrations in the y1 mode and the y2 mode. In contrast, as shown in FIG. 5C, in the casein which the difference |fd−fy2| between the y2-mode vibrational frequency fy2 and the drive vibrational frequency fd of the vibration arms is smaller than the difference |fd−fy1| between the y1-mode vibrational frequency fy1 and the drive vibrational frequency fd of the vibration arms, the vibration in the y2 mode becomes easier to excite, and thus, the excitation of the vibration in the y1 mode is suppressed to be difficult to excite.

Figure 6:
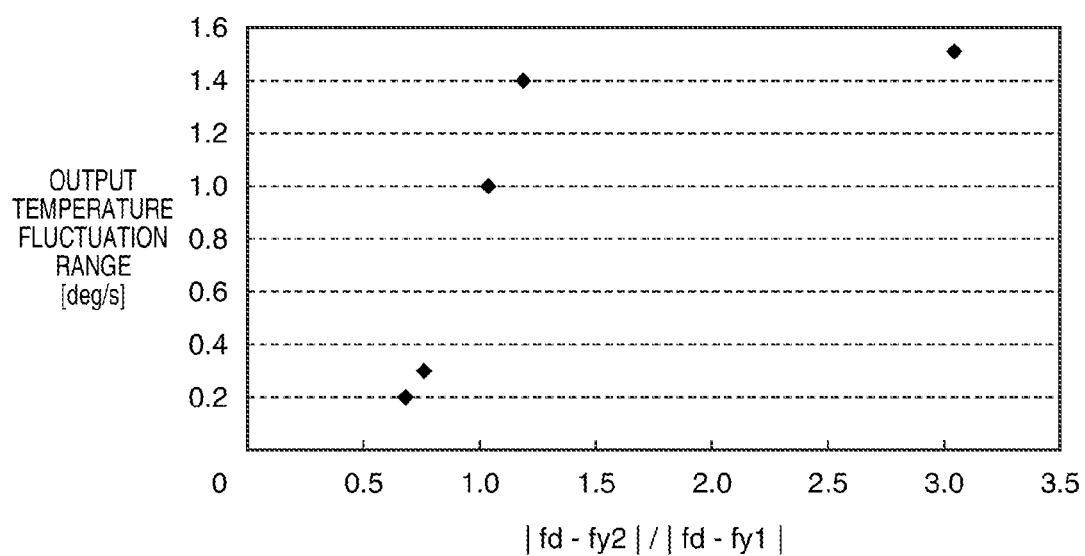
FIG. 6 is a graph showing an output temperature fluctuation range of a vibrator.

FIG. 6 is a graph showing the influence exerted on the temperature fluctuation range of the output of the gyro element 2 by the relationship between the difference |fd−fy2| between the y2-mode vibrational frequency fy2 and the drive vibrational frequency fd of the vibration arms and the difference |fd−fy1| between the y1-mode vibrational frequency fy1 and the drive vibrational frequency fd of the vibration arms. As shown in FIG. 6, it is understood that taking the point, at which the value |fd−fy2|/|fd−fy1| is equal to "1," namely, |fd−fy2| and |fd−fy1| are equal to each other, as a boundary, on the side where the value is smaller (in the case in which the y2-mode vibrational frequency fy2 is more approximate to the drive vibrational frequency fd), the temperature fluctuation range of the output of the gyro element 2 is extremely small. Further, it is understood that taking the point, at which the value |fd−fy2|/|fd−fy1| is equal to "1," namely, |fd−fy2| and |fd−fy1| are equal to each other, as the boundary, on the side where the value is greater (in the case in which the y1-mode vibrational frequency fy1 is more approximate to the drive vibrational frequency fd), the temperature fluctuation range of the output of the gyro element 2 is extremely large. As described above, by setting the relationship between the drive vibrational frequency fd of the first through fourth drive vibration arms 441, 443, 442, and 444, the y1-mode vibrational frequency fy1, and the y2-mode vibrational frequency fy2 to |fd−fy1|>|fd−fy2|, the vibration in the y1 mode becomes difficult to excite, and thus, it becomes possible to suppress the influence of the output characteristic of the gyro element 2 on the temperature drift.

Therefore, since the gyro element 2 is arranged to be difficult to excite the vibration in the y1 mode, which affects the temperature drift as the unwanted mode vibration, it becomes possible to suppress the temperature drift related to the output characteristic of the gyro element 2. Thus, it becomes possible to provide the gyro element 2 having stable characteristics low in temperature drift.

Package

The package 9 is for housing the gyro element 2. It should be noted that the package 9 can also house, for example, an IC chip for performing, for example, the drive of the gyro element 2 besides the gyro element 2 as in the case of an electronic device described later. Such a package 9 has a roughly rectangular shape in a plan view (a plan view in the x-y plane) thereof.

The package 9 has a base 91 provided with a recessed section opened upward, and a lid (a lid member) 92 bonded to the base 91 so as to block the opening of the recessed section. Further, the base 91 has a bottom plate 911 having a plate-like shape, and a side wall 912 having a frame shape disposed in the peripheral edge portion on the upper surface of the bottom plate 911. Such a package 9 has a housing space inside, and the gyro element 2 is airtightly housed and disposed inside the housing space.

The gyro element 2 is fixed to the upper surface of the bottom plate 911 in the first and second fixation sections 51, 52 via electrically-conductive fixing members 8 such as solder, silver paste, or an electrically-conductive adhesive (an adhesive with an electrically-conductive filler such as metal particles dispersed in a resin material). Since the first and second fixation sections 51, 52 are located at both end portions in the y-axis direction of the gyro element 2, by fixing such parts to the bottom plate 911, the vibrating body 4 of the gyro element 2 is supported at both ends, and thus, it is possible to stably fix the gyro element 2 to the bottom plate 911. Therefore, the unwanted vibration (the vibration other than the detection vibration) of the gyro element 2 is suppressed, and thus, the detection accuracy of the angular velocity ω by the gyro element 2 is improved.

Further, the electrically-conductive fixing members 8 are disposed at six places separated from each other so as to correspond to (have contact with) two detection signal terminals 714, two detection ground terminals 724, a drive signal terminal 734, and a drive ground terminal 744 all provided to the first and second fixation sections 51, 52. Further, on the upper surface of the bottom plate 911 there are disposed six connection pads 10 corresponding to the two detection signal terminals 714, the two detection ground terminals 724, the drive signal terminal 734, and the drive ground terminal 744, and the connection pads 10 and the respective terminals are electrically connected to each other via the electrically-conductive members 8.

According to the vibrator 1 described above, since the gyro element 2 difficult to excite the vibration in the y1 mode, which affects the temperature drift of the vibrator element as the unwanted mode vibration, is used, it becomes possible to suppress the temperature drift related to the output characteristic of the gyro element 2. Therefore, the stable vibrator 1 low in temperature drift of the output characteristic can be obtained.

Further, the base section 41 is connected to the first fixation section 51 and the second fixation section 52 disposed so as to be opposed to each other using each of the first connection beam 61, the second connection beam 62, the third connection beam 63, and the fourth connection beam 64. Thus, it becomes possible to relax the stress generated from the base section 41 to the first connection beam 61, the second connection beam 62, the third connection beam 63, and the fourth connection beam 64, and thus, it becomes possible to reduce the propagation of the vibration to the first fixation section 51 and the second fixation section 52 due to the vibration leakage phenomenon propagating to these beams. Therefore, it becomes possible to reduce the temperature drift due to the vibration leakage phenomenon, and the detection of the angular velocity with the temperature drift reduced becomes possible in combination with the reduction of the temperature drift due to the unwanted vibration described above.

Gyro Element According To Second Embodiment

Figure 7A:
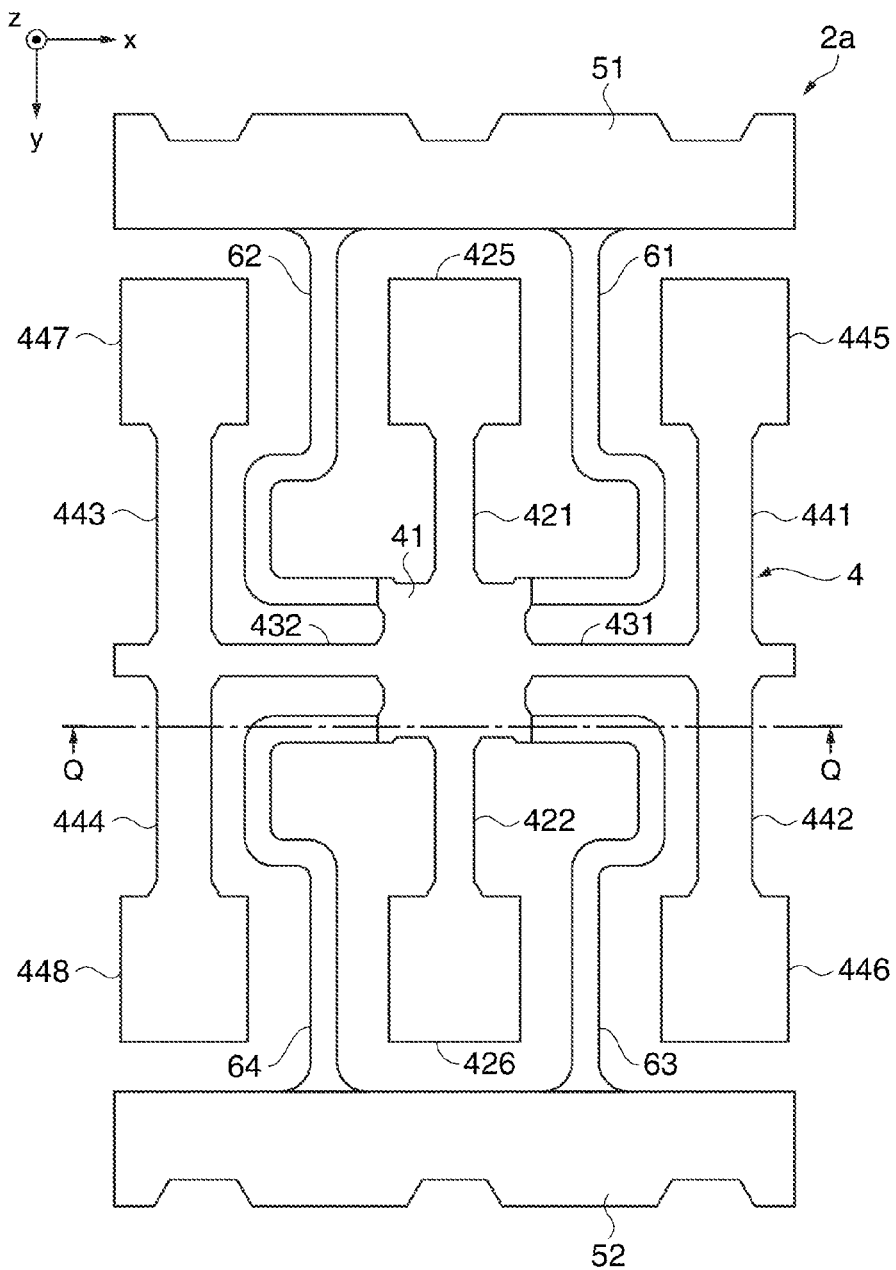
Figure 7B:
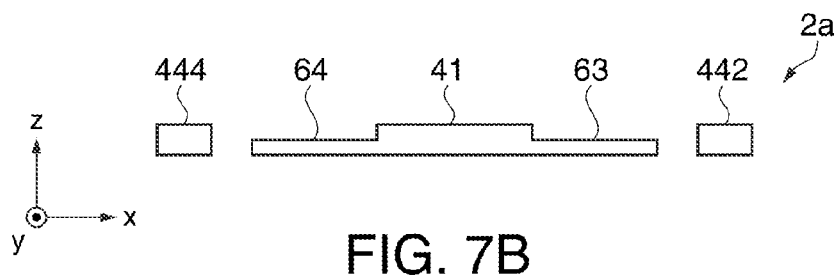

A gyro element according to the second embodiment will be explained using FIGS. 7A and 7B. FIGS. 7A and 7B are diagrams showing the gyro element according to the second embodiment, wherein FIG. 7A is a plan view, and FIG. 7B is a cross-sectional view along the Q-Q line in FIG. 7A. It should be noted that in the explanation of the second embodiment, the same components as in the first embodiment described above are denoted with the same reference symbols, and the detailed explanation thereof might be omitted.

As shown in FIGS. 7A and 7B, similarly to the gyro element 2 according to the first embodiment, the gyro element 2a according to the second embodiment has the vibrating body 4 forming the so-called double-T type, the first fixation section 51 and the second fixation section 52 for supporting the vibrating body 4, and the first connection beam 61, the second connection beam 62, the third connection beam 63, and the fourth connection beam 64 as the beams for connecting the vibrating body 4 and the first and second fixation sections 51, 52 to each other.

The vibrating body 4 spreads in the x-y plane, and has a thickness in the z-axis direction. Such a vibrating body 4 as described above has the base section 41 located at the center, the first detection vibration arm 421 and the second detection vibration arm 422 extending from the base section on both sides along the y-axis direction, the first connection arm 431 and the second connection arm 432 extending from the base section 41 on both sides along the x-axis direction, the first drive vibration arm 441 as the first vibration arm and the third drive vibration arm 442 as the second vibration arm extending from the tip portion of the first connection arm 431 on both sides along the y-axis direction, and the second drive vibration arm 443 as the first vibration arm and the fourth drive vibration arm 444 as the second vibration arm extending from the tip portion of the second connection arm 432 on both sides along the y-axis direction. At the tip portions of the first and second detection vibration arms 421, 422, and the first through fourth drive vibration arms 441, 443, 442, and 444, there are respectively disposed the weight sections (the hammerheads) 425, 426, 445, 447, 446, and 448 as the wider portions each having a quadrangular shape with a larger width than the base end side.

The gyro element 2a according to the second embodiment is configured so that the thickness of the first connection beam 61, the second connection beam 62, the third connection beam 63, and the fourth connection beam 64 is smaller than the thickness of the base section 41. The first connection beam 61, the second connection beam 62, the third connection beam 63, and the fourth connection beam 64 each have a thin-wall shape started from the part where the connection beam extends from the base section 41 to form a step, and the thin-wall shape continues to the part where the connection beam is connected to the first or the second fixation section 51, 52.

By forming the first connection beam 61, the second connection beam 62, the third connection beam 63, and the fourth connection beam 64 to have the thin-wall shape, the rigidity of the first connection beam 61, the second connection beam 62, the third connection beam 63, and the fourth connection beam 64 is weakened. Thus, as in the case of the first embodiment, it is possible to increase the difference between the y1-mode vibrational frequency fy1 of the y1 mode and the drive vibrational frequency fd of the first through fourth drive vibration arms 441, 443, 442, and 444, and further, to decrease the difference between the y2-mode vibrational frequency fy2 of the y2 mode and the drive vibrational frequency fd of the first through fourth drive vibration arms 441, 443, 442, and 444. In other words, it becomes possible to provide the gyro element 2a, which fulfills the frequency condition (|fd−fy1|>|fd−fy2|) explained in the first embodiment section, and has low temperature drift.

It should be noted that as a modified example, it is also effective to thin the width of the first connection beam 61, the second connection beam 62, the third connection beam 63, and the fourth connection beam 64 in order to weaken the rigidity of the first connection beam 61, the second connection beam 62, the third connection beam 63, and the fourth connection beam 64.

Gyro Element According To Third Embodiment

Figure 8:
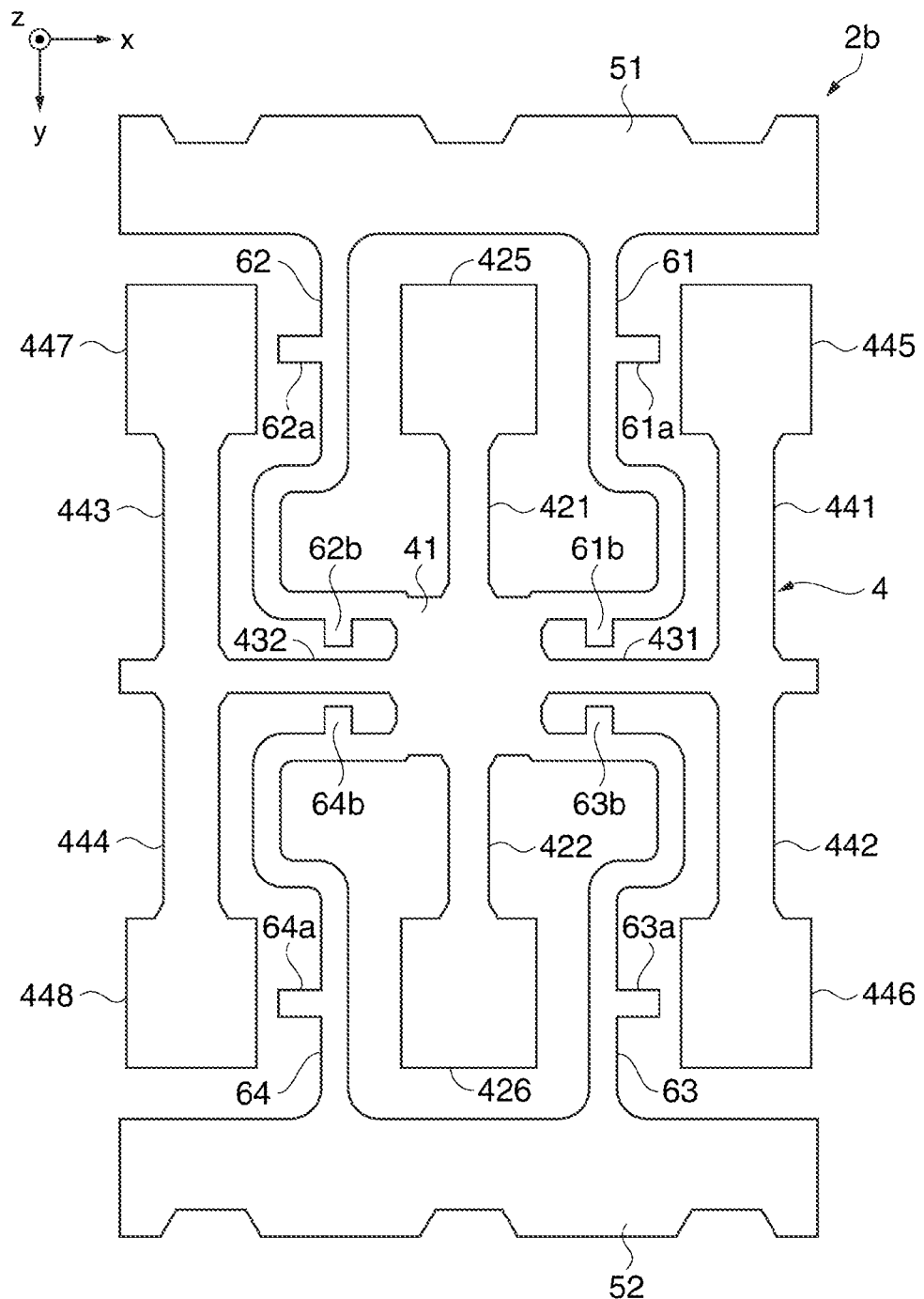
FIG. 8 is a plan view showing a gyro element according to a third embodiment of the invention.

A gyro element according to the third embodiment will be explained using FIG. 8. FIG. 8 is a plan view showing the gyro element according to the third embodiment. It should be noted that in the explanation of the third embodiment, the same components as in the first embodiment described above are denoted with the same reference symbols, and the detailed explanation thereof might be omitted.

As shown in FIG. 8, similarly to the gyro element 2 according to the first embodiment, the gyro element 2b according to the third embodiment has the vibrating body 4 forming the so-called double-T type, the first fixation section 51 and the second fixation section 52 for supporting the vibrating body 4, and the first connection beam 61, the second connection beam 62, the third connection beam 63, and the fourth connection beam 64 as the beams for connecting the vibrating body 4 and the first and second fixation sections 51, 52 to each other.

The vibrating body 4 spreads in the x-y plane, and has a thickness in the z-axis direction. Such a vibrating body 4 as described above has the base section 41 located at the center, the first detection vibration arm 421 and the second detection vibration arm 422 extending from the base section on both sides along the y-axis direction, the first connection arm 431 and the second connection arm 432 extending from the base section 41 on both sides along the x-axis direction, the first drive vibration arm 441 as the first vibration arm and the third drive vibration arm 442 as the second vibration arm extending from the tip portion of the first connection arm 431 on both sides along the y-axis direction, and the second drive vibration arm 443 as the first vibration arm and the fourth drive vibration arm 444 as the second vibration arm extending from the tip portion of the second connection arm 432 on both sides along the y-axis direction. At the tip portions of the first and second detection vibration arms 421, 422, and the first through fourth drive vibration arms 441, 443, 442, and 444, there are respectively disposed the weight sections (the hammerheads) 425, 426, 445, 447, 446, and 448 as the wider portions each having a quadrangular shape with a larger width than the base end side.

The gyro element 2b according to the third embodiment has the first connection beam 61, the second connection beam 62, the third connection beam 63, and the fourth connection beam 64 provided with projection sections 61a, 61b, 62a, 62b, 63a, 63b, 64a, and 64b disposed toward the first through fourth drive vibration arms 441, 443, 442, and 444 or the first and second connection arms 431, 432.

By providing the projection sections 61a, 61b, 62a, 62b, 63a, 63b, 64a, and 64b to the first connection beam 61, the second connection beam 62, the third connection beam 63, and the fourth connection beam 64 as described above, even in the case in which the first connection beam 61, the second connection beam 62, the third connection beam 63, and the fourth connection beam 64 are deformed due to, for example, an external impact, it results that either of the projection sections 61a, 61b, 62a, 62b, 63a, 63b, 64a, and 64b thus provided have contact with the first through fourth drive vibration arms 441, 443, 442, and 444 or the first and second connection arms 431, 432. In other words, the projection sections 61a, 61b, 62a, 62b, 63a, 63b, 64a, and 64b function as so-called buffers for absorbing the impact, and it becomes possible to prevent a breakage and so on of the gyro element 2b. In particular, in the configuration of weakening the rigidity of the first connection beam 61, the second connection beam 62, the third connection beam 63, and the fourth connection beam 64 as in the gyro element 2a according to the second embodiment, since the first connection beam 61, the second connection beam 62, the third connection beam 63, and the fourth connection beam 64 are easy to deform, a greater advantage can be obtained.

Further, also in the gyro element 2b according to the third embodiment, as in the case of the first and second embodiments, it is possible to increase the difference between the y1-mode vibrational frequency fy1 of the y1 mode and the drive vibrational frequency fd of the first through fourth drive vibration arms 441, 443, 442, and 444, and further, to decrease the difference between the y2-mode vibrational frequency fy2 of the y2 mode and the drive vibrational frequency fd of the first through fourth drive vibration arms 441, 443, 442, and 444. In other words, it becomes possible to provide the gyro element 2b, which fulfills the frequency condition (|fd−fy1|>|fd−fy2|) as in the first and second embodiments, and has low temperature drift.

It should be noted that although in the above description, the explanation is presented using the example of providing the projection sections 61a, 61b, 62a, 62b, 63a, 63b, 64a, and 64b to the first connection beam 61, the second connection beam 62, the third connection beam 63, and the fourth connection beam 64, the invention is not limited to this configuration. For example, it is also possible to adopt the configuration of providing the projection sections to the first through fourth drive vibration arms 441, 443, 442, and 444 or the first and second connection arms 431, 432 so as to be opposed to the first connection beam 61, the second connection beam 62, the third connection beam 63, and the fourth connection beam 64.

It should be noted that although in the embodiments described above, the explanation is presented using the so-called "double-T type" gyro elements 2, 2a, and 2b as an example of the vibrator element according to the invention, the vibrator element is not limited to the gyro elements. It is sufficient for the vibrator element according to the invention to have a configuration having the vibration arms extending from one end and the other end opposed to the one end of the base section, namely on both sides of the base section, and a so-called "H-type" gyro vibrator element, a vibrator element having tuning-fork vibration arms extending from the base section in the respective directions opposite to each other, and so on can be cited.

Further, the vibrator element according to the invention can also be applied to a piezoelectric thin film drive type vibrator element having a piezoelectric thin film formed on a substrate as the vibratory source, an MEMS (Micro Electro Mechanical System) type vibrator element, an electrostatic drive type vibrator element, and so on.

Electronic Device

Figure 9:
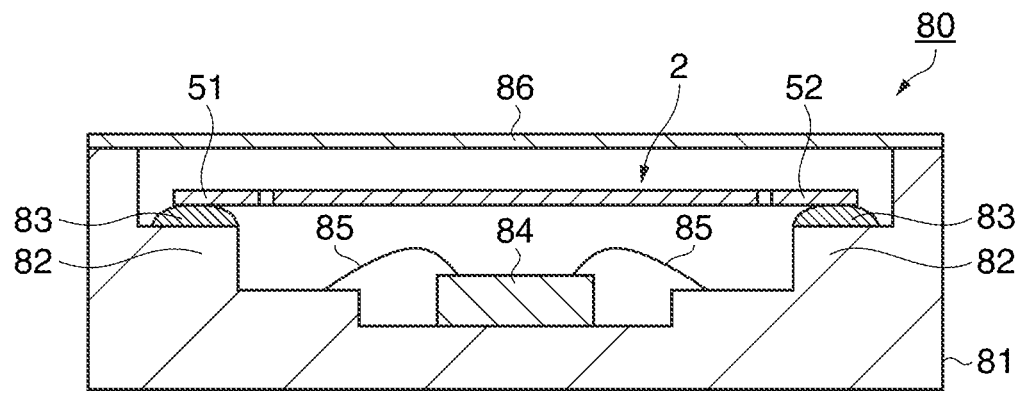
FIG. 9 is a front cross-sectional view showing an electronic device using the vibrator element according to an embodiment of the invention.

Then, a gyro sensor as an example of the electronic device using the gyro elements 2, 2a, 2b described above will be explained using FIG. 9. FIG. 9 is a front cross-sectional view showing an outline of the gyro sensor. It should be noted that in the explanation here, an example using the gyro element 2 according to the first embodiment among the embodiments described above is used.

The gyro sensor 80 is provided with the gyro element 2 as the vibrator element, an IC 84 as a circuit component, a container 81 as the package, and a lid member 86. The IC 84 is disposed on the bottom surface of the container 81 formed of ceramics, and electrically connected to wiring (not shown) provided to the container 81 with wires 85 made of, for example, Au. The IC 84 includes a drive circuit for driving the vibration of the gyro element 2, and a detection circuit for detecting the detection signal generated in the gyro element 2 in response to the angular velocity applied to the gyro element 2.

The gyro element 2 is supported by the support platform 82 provided to the container 81 with the fixation sections 51, 52 of the gyro element 2 bonded to the support platform 82 via the fixing members 83 such as electrically-conductive adhesives. Further, wiring lines (not shown) are formed on the surface of the support platform 82, and the electrical conduction between the electrodes of the gyro element 2 and the wiring lines is achieved via the fixing members 83. It is preferable for the fixing members 83 to be an elastic material. As the fixing members 83 having elasticity, there is known, for example, an electrically-conductive adhesive having silicone as the base material. Further, the opening in the upper part of the container 81 is sealed by the lid member 86 while keeping a vacuum atmosphere inside the container 81.

Since the vibration in the y1 mode, which is the unwanted mode vibration, is suppressed in the gyro element 2, the temperature drift of the gyro element 2 due to the influence of the vibration in the y1 mode can be reduced. Therefore, the gyro sensor 80 using the gyro element 2 also has the stable characteristic with the temperature drift reduced.

Although in the explanation of the electronic device described above, the explanation is presented citing the gyro sensor 80 using the so-called double-T type gyro elements 2, 2a, 2b as the vibrator element, the electronic device is not limited to this example. As another electronic device, there can be cited, for example, a gyro sensor using the H-type or a tuning-fork type gyro element, a timing device (a quartz crystal vibrator, a quartz crystal oscillator, and so on) using a quartz crystal vibrator element, and a pressure sensor using a pressure-sensitive element.

Electronic Apparatus

Subsequently, the electronic apparatuses to which the gyro elements 2, 2a, 2b as the vibrator element according to an embodiment of the invention, the vibrator 1 using the gyro elements 2, 2a, 2b as the vibrator element, or the gyro sensor 80 as the electronic device is applied will be explained in detail based on FIGS. 10 through 12. It should be noted that in the explanation, an example of applying the vibrator 1 using the gyro element 2 as the vibrator element is described.

Figure 10:
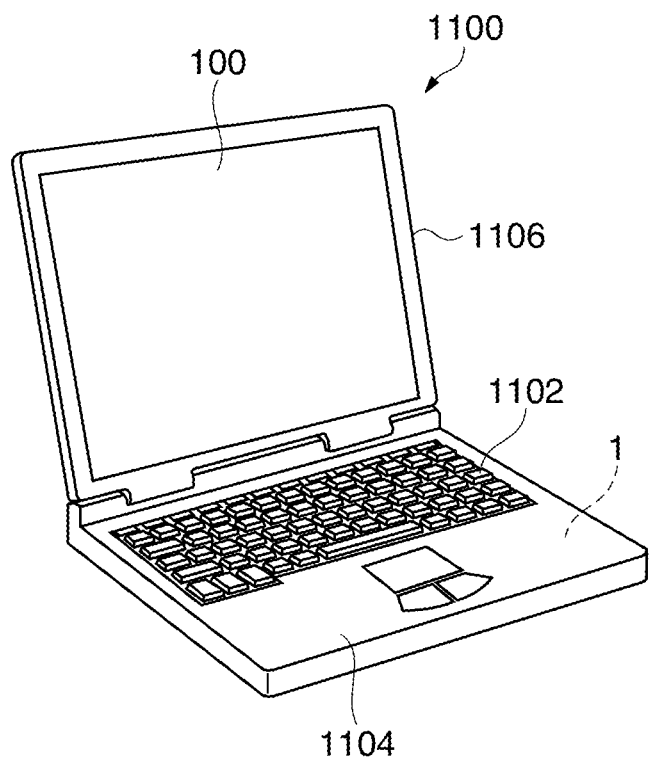
FIG. 10 is a perspective view showing a configuration of a mobile personal computer as an example of the electronic apparatus.

FIG. 10 is a perspective view showing a schematic configuration of a mobile type (or a laptop type) personal computer as the electronic apparatus equipped with the vibrator 1 according to an embodiment of the invention. In the drawing, the personal computer 1100 includes a main body section 1104 provided with a keyboard 1102, and a display unit 1106 provided with a display section 100, and the display unit 1106 is pivotally supported with respect to the main body section 1104 via a hinge structure. Such a personal computer 1100 incorporates the vibrator 1 using the gyro element 2 provided with the function of detecting the angular velocity.

Figure 11:
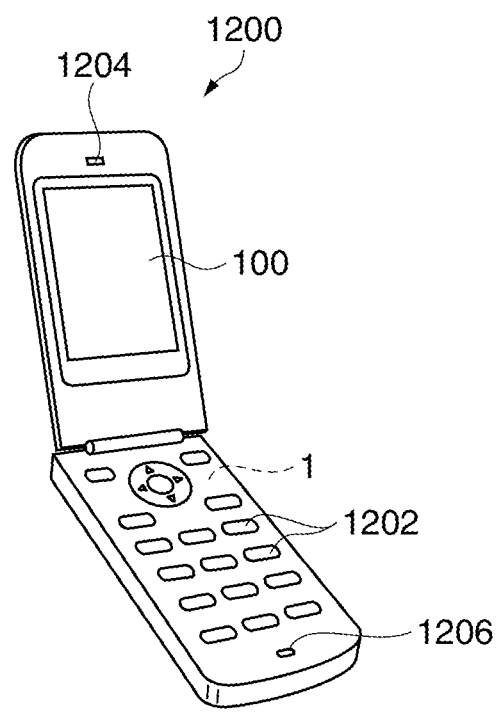
FIG. 11 is a perspective view showing a configuration of a cellular phone as an example of the electronic apparatus.

FIG. 11 is a perspective view showing a schematic configuration of a cellular phone (including PHS) as the electronic apparatus equipped with the vibrator 1 according to an embodiment of the invention. In this drawing, the cellular phone 1200 is provided with a plurality of operation buttons 1202, an ear piece 1204, and a mouthpiece 1206, and the display section 100 is disposed between the operation buttons 1202 and the ear piece 1204. Such a cellular phone 1200 incorporates the vibrator 1 using the gyro element 2 functioning as an angular velocity sensor or the like.

Figure 12:
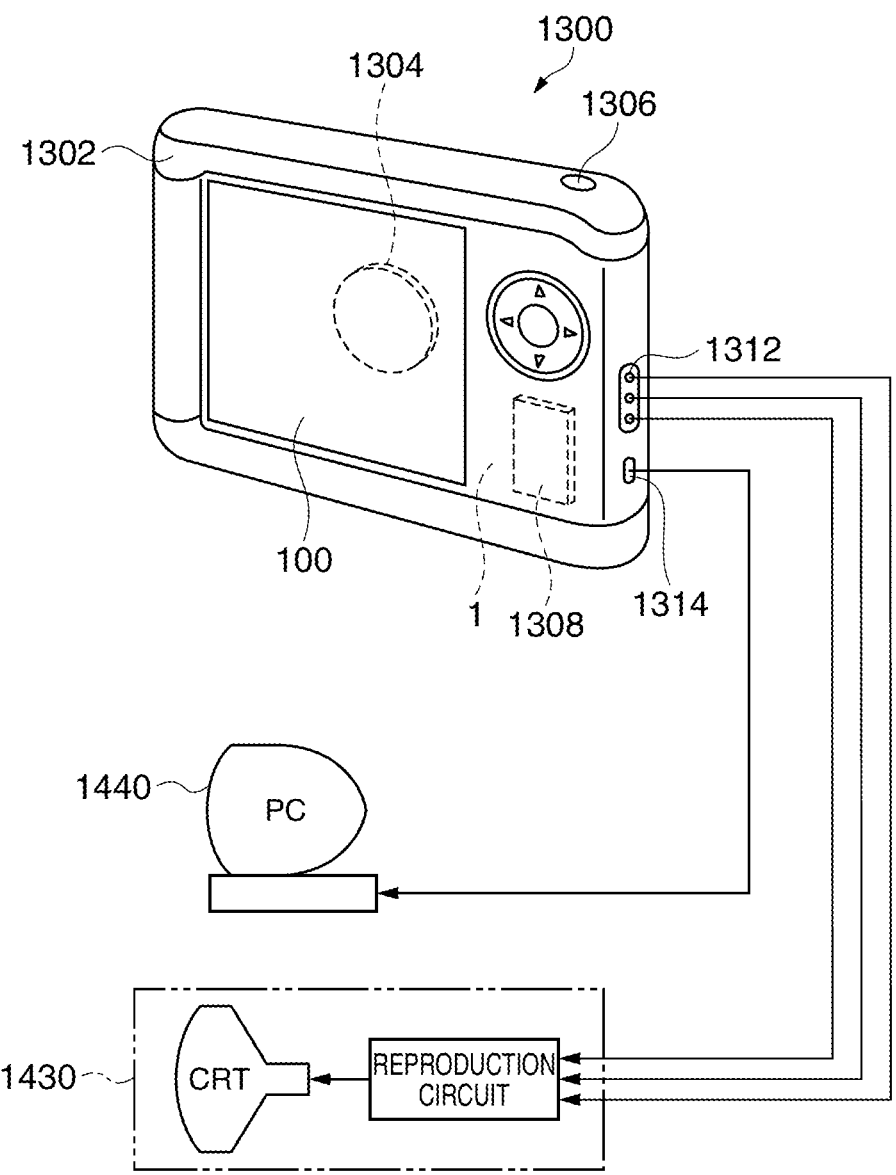
FIG. 12 is a perspective view showing a configuration of a digital still camera as an example of the electronic apparatus.

FIG. 12 is a perspective view showing a schematic configuration of a digital still camera as the electronic apparatus equipped with the vibrator 1 according to an embodiment of the invention. It should be noted that the connection with external equipment is also shown briefly in this drawing. Here, existing cameras expose a silver salt film to an optical image of an object, while the digital still camera 1300 performs photoelectric conversion on an optical image of an object by an imaging element such as a CCD (a charge coupled device) to generate an imaging signal (an image signal).

A case (a body) 1302 of the digital still camera 1300 is provided with a display section 100 disposed on the back surface thereof to have a configuration of performing display in accordance with the imaging signal from the CCD, wherein the display section 100 functions as a viewfinder for displaying the object as an electronic image. Further, the front surface (the back side in the drawing) of the case 1302 is provided with a light receiving unit 1304 including an optical lens (an imaging optical system), the CCD, and so on.

When the photographer checks an object image displayed on the display section 100, and then holds down a shutter button 1306, the imaging signal from the CCD at that moment is transferred to and stored in the memory device 1308. Further, the digital still camera 1300 is provided with video signal output terminals 1312 and an input-output terminal 1314 for data communication disposed on a side surface of the case 1302. Further, as shown in the drawing, a television monitor 1430 and a personal computer 1440 are respectively connected to the video signal output terminals 1312 and the input-output terminal 1314 for data communication according to needs. Further, there is adopted the configuration in which the imaging signal stored in the memory device 1308 is output to the television monitor 1430 and the personal computer 1440 in accordance with a predetermined operation. Such a digital still camera 1300 incorporates the vibrator 1 using the gyro element 2 functioning as an angular velocity sensor or the like.

It should be noted that, the vibrator 1 according to an embodiment of the invention can also be applied to an electronic apparatus such as an inkjet ejection device (e.g., an inkjet printer), a laptop personal computer, a television set, a video camera, a video cassette recorder, a car navigation system, a pager, a personal digital assistance (including one with a communication function), an electronic dictionary, an electric calculator, a computerized game machine, a word processor, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, various types of measurement instruments, various types of gauges (e.g., gauges for a vehicle, an aircraft, or a ship), and a flight simulator besides the personal computer (the mobile personal computer) shown in FIG. 10, the cellular phone shown in FIG. 11, and the digital still camera shown in FIG. 12.

Moving object

Figure 13:
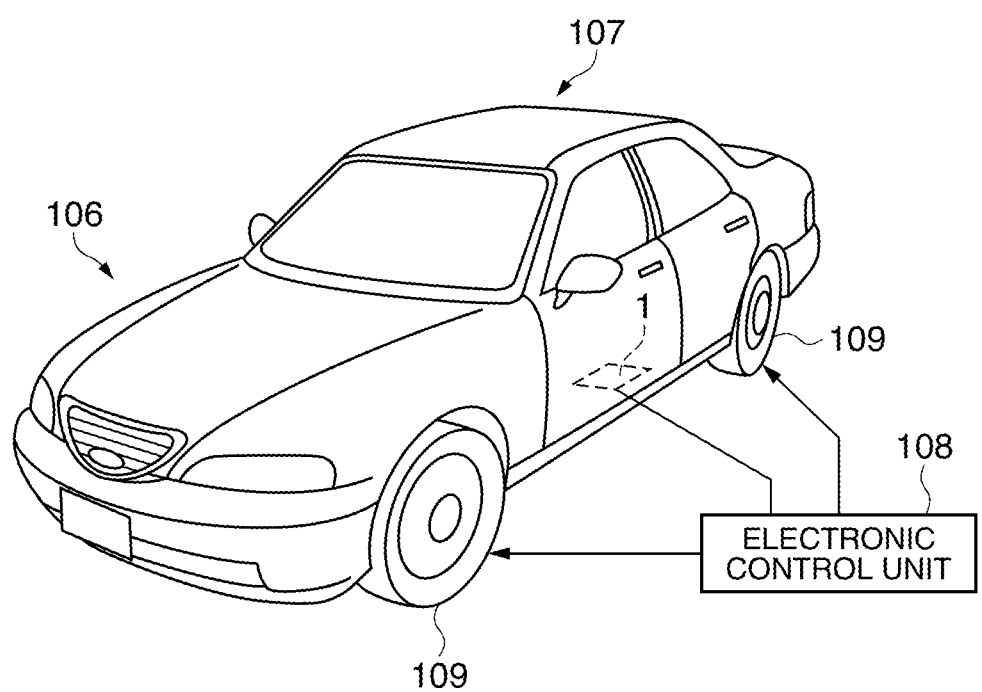
FIG. 13 is a perspective view showing a configuration of a vehicle as an example of the moving object.

FIG. 13 is a perspective view schematically showing a vehicle as an example of the moving object. The vehicle 106 is equipped with the vibrator 1 using the gyro element 2 according to the invention. For example, as shown in the drawing, in the vehicle 106 as the moving object, an electronic control unit 108 incorporating the vibrator 1 using the gyro element 2 and for controlling tires 109 and so on is installed in a vehicle body 107. Further, besides the above, the vibrator 1 can widely be applied to an electronic control unit (ECU) such as a keyless entry system, an immobilizer, a car navigation system, a car air-conditioner, an anti-lock braking system (ABS), an air-bag system, a tire pressure monitoring system (TPMS), an engine controller, a battery monitor for a hybrid car or an electric car, or a vehicle posture control system.

The entire disclosure of Japanese Patent Application No. 2012-206659, filed Sep. 20, 2012 is expressly incorporated by reference herein.

What is claimed is:

1. A vibrator element comprising:
   a base section;
   a first vibration arm extending from the base section; and
   a second vibration arm extending from the base section along a direction opposite to a direction in which the first vibration arm extends,
   wherein the vibrator element fulfills the relationship:

$$|fd-fy1|>|fd-fy2|$$

where
   fd is a drive vibrational frequency at which the first vibration arm and the second vibration arm vibrate along a second direction perpendicular to a first direction in which one of the first vibration arm and the second vibration arm extends, fy1 is a y1-mode vibrational frequency at which the base section, the first vibration arm, and the second vibration arm vibrate in the same direction along the first direction, and fy2 is a y2-mode vibrational frequency at which the base section vibrates along the first direction, and the first vibration arm and the second vibration arm vibrate along the first direction in an opposite direction to a direction in which the base section vibrates.

2. The vibrator element according to claim 1, wherein
   the y1-mode vibrational frequency fy1 is a frequency, at which a centroid of the base section and the first vibration arm and the second vibration arm vibrate in the same direction along the first direction, and
   the y2-mode vibrational frequency fy2 is a frequency, at which a centroid of the base section vibrates along the first direction, and the first vibration arm and the second vibration arm vibrate along the first direction in an opposite direction to a direction in which the centroid of the base section vibrates.

3. The vibrator element according to claim 1, further comprising:
   a first beam and a second beam extending from the base section in respective directions opposite to each other in a plan view;
   a first fixation section connected to the first beam; and
   a second fixation section disposed on an opposite side to the first beam across the base section in the plan view, and connected to the second beam.

4. The vibrator element according to claim 3, wherein
   a thickness of each of the first beam and the second beam is smaller than a thickness of the base section.

5. The vibrator element according to claim 3, wherein
   the first beam and the second beam extend along the first direction,
   the first beam is provided with a projection section disposed toward the first vibration arm, and
   the second bean is provided with a projection section disposed toward the second vibration arm.

6. The vibrator element according to claim 3, further comprising:
   a first detection vibration arm and a second detection vibration arm extending from the base section toward both sides along the first direction.

7. The vibrator element according to claim 6, wherein
   the first vibration arm includes
      a first drive vibration arm and
      a second drive vibration arm,
   the second vibration arm includes
      a third drive vibration arm and
      a fourth drive vibration arm,
   the first beam includes
      a first connection beam extending from the base section and passing between the first detection vibration arm and the first drive vibration arm, and
      a second connection beam extending from the base section and passing between the first detection vibration arm and the second drive vibration arm,
   the second beam includes
      a third connection beam extending from the base section and passing between the second detection vibration arm and the third drive vibration arm, and
      a fourth connection beam extending from the base section and passing between the second detection vibration arm and the fourth drive vibration arm, and
   the base section is connected to the first fixation section and the second fixation section via the first connection beam, the second connection beam, the third connection beam, and the fourth connection beam.

8. A vibrator comprising:
the vibrator element according to claim 1; and
a package adapted to house the vibrator element.

9. A vibrator comprising:
the vibrator element according to claim 2; and
a package adapted to house the vibrator element.

10. A vibrator comprising:
the vibrator element according to claim 3; and
a package adapted to house the vibrator element.

11. An electronic device comprising:
the vibrator element according to claim 1; and
a circuit component having a function of driving the vibrator element.

12. An electronic device comprising:
the vibrator element according to claim 2; and
a circuit component having a function of driving the vibrator element.

13. An electronic device comprising:
the vibrator element according to claim 3; and
a circuit component having a function of driving the vibrator element.

14. An electronic apparatus comprising:
the vibrator element according to claim 1.

15. An electronic apparatus comprising:
the vibrator element according to claim 2.

16. An electronic apparatus comprising:
the vibrator element according to claim 3.

17. A moving object comprising:
the vibrator element according to claim 1.

18. A moving object comprising:
the vibrator element according to claim 2.

19. A moving object comprising:
the vibrator element according to claim 3.

* * * * *